United States Patent
Walton

[11] Patent Number: 6,128,058
[45] Date of Patent: Oct. 3, 2000

[54] LIQUID CRYSTAL DEVICE WITH PATTERNED REACTIVE MESOGEN ALIGNMENT LAYER

[75] Inventor: Harry Garth Walton, Cowley, United Kingdom

[73] Assignee: Sharp Kabushiki Kaisha, Osaka, Japan

[21] Appl. No.: 09/082,813

[22] Filed: May 21, 1998

[30] Foreign Application Priority Data

May 22, 1997 [GB] United Kingdom .................. 9710481

[51] Int. Cl.[7] .................................................. G02F 1/1337
[52] U.S. Cl. .......................................... 349/129; 349/127
[58] Field of Search .................................. 349/73, 75, 76, 349/129, 127, 117, 183

[56] References Cited

U.S. PATENT DOCUMENTS

| | | | |
|---|---|---|---|
| 5,250,214 | 10/1993 | Kanemoto et al. | 349/183 |
| 5,456,867 | 10/1995 | Mazaki et al. | 264/2.6 |
| 5,552,908 | 9/1996 | Kim et al. | 349/74 |
| 5,602,661 | 2/1997 | Schadt et al. | 349/124 |
| 5,784,137 | 7/1998 | Shiomi et al. | 349/88 |
| 5,867,237 | 2/1999 | Yazaki et al. | 349/129 |
| 5,943,110 | 8/1999 | Yoda et al. | 349/76 |
| 5,953,091 | 9/1999 | Jones et al. | 349/129 |

FOREIGN PATENT DOCUMENTS

| | | |
|---|---|---|
| 0445629 | 9/1991 | European Pat. Off. . |
| 0467456 | 4/1995 | European Pat. Off. . |
| 0706074 | 10/1995 | European Pat. Off. . |
| 0689084 | 12/1995 | European Pat. Off. . |
| 7253578 | 3/1994 | Japan . |

OTHER PUBLICATIONS

M. Schadt et al., Nature, vol. 381, pp. 212–215, 1996, "Optical Patterning of Multidomain Liquid–Crystal Displays with Wide Viewing Angles".

M. Schadt et al., JPN. J. Appl. Phys., vol. 31, No. 7, pp. 2155–2164, 1992, "Surface–Induced Parallel Alignment of Liquid Crystals by Linearly Polymerized Photopolymers".

H. Stegemeyer et al., Z. Naturforsch, 44a, pp. 1127–1130, 1989, "Liquid Crystalline Norcholesterylesters: Influence of the Axial Methylgroups on the Phase Transitions and the Cholesteric Hexix".

W.M. Gibbons et al., Nature, vol. 351, pp. 49–50, 1991, "Surface–Mediated Alignment of Nematic Liquid Crystals with Polarized Laser Light".

Search Report for Application No. GB 9710481.4; Dated Aug. 19, 1997.

*Primary Examiner*—Kenneth Parker
*Attorney, Agent, or Firm*—Renner, Otto, Boisselle & Sklar

[57] ABSTRACT

A liquid crystal device has a substrate with first and second alignment layers thereon. The first alignment layer is unidirectionally aligned. The second alignment layer is a layer formed of a cured twisted reactive mesogen composition which is patterned by masking, curing and dissolving uncured regions of the layer so as to expose first alignment regions defined by the layer, and to leave second alignment regions in the layer. The first alignment regions have a different alignment direction from that of the second alignment regions. A liquid crystal layer is provided over the resultant alignment layer structure.

24 Claims, 3 Drawing Sheets

LIQUID CRYSTAL DEVICE WITH PATTERNED REACTIVE MESOGEN ALIGNMENT LAYER

TECHNICAL FIELD OF THE INVENTION

This invention relates to a liquid crystal device of the type comprising a substrate, a patterned alignment layer structure on the substrate, and a liquid crystal layer having a surface in contact with the alignment layer structure, wherein the patterned alignment layer structure has a plurality of alignment regions having different alignment directions; and to a method of producing such a device. In such a device, the patterned alignment layer structure aligns adjacent liquid crystal molecules in the liquid crystal layer in a spatially varying fashion and such an arrangement has potential use in wide viewing angle liquid crystal displays for use, for example, in television and computer screens. Such a layer structure can also be used in pixellated polarising arrays in 3D television and imaging.

BACKGROUND OF THE INVENTION

It is known to provide an alignment layer structure by forming a polyimide layer on a substrate followed by rubbing or buffing. Whilst such a procedure provides a good way of achieving unidirectional alignment, patterned alignment by rubbing relies on rubbing only certain areas of the polymer surface through a mask interposed between the rubbing cloth and the polymer surface. The mask is then replaced with a second mask exposing different areas of the surface and rubbing is repeated in a different direction. These methods are difficult to implement on a manufacturing scale and are only partially successful.

EP-A-0689084 and U.S. Pat. No. 5,602,661 disclose a patterned alignment layer structure which involves exposing through masking different parts of a photo-orientable polymer network (PPN) layer to curing radiation which is polarised in different directions. The direction of polarisation of the radiation which cures the PPN determines the alignment in the exposed parts of the layer structure. The use of radiation polarised in selected directions to control alignment direction is also disclosed by M. Shadt et al, Nature, Vol 391, 1996 pages 212 to 215; M. Shadt et al, Japan J. Appl. Phys, Vol 31 (1992) pages 2155–2164, and W. M. Gibbons et al, Nature, 351, 49 (1991). However, all of these disclosures require a special polymerisable composition for the PPN layer and multiple exposures of the surface of the alignment layer through photo masks with the polarisation state of the curing radiation being altered between exposures.

U.S. Pat. No. 5,602,661 mentions the possibility of incorporating chiral molecules in the PPN layer. However, the purpose of this is to provide different optical properties in the layer, such as colour filtering.

It is an object of the present invention to provide a liquid crystal device having a patterned alignment layer structure which can be produced in a relatively simple and convenient way without the need to effect multiple rubbing steps or to use a plurality of photo masking and polarised light exposure steps.

According to a first aspect of the present invention, there is provided a liquid crystal device comprising a substrate; a patterned alignment layer structure on the substrate; and a liquid crystal layer having a surface in contact with the patterned alignment layer structure, the patterned alignment layer structure having a plurality of alignment regions with different alignment directions, characterised in that the patterned alignment layer structure comprises a first alignment layer having a first alignment direction and a second alignment layer disposed over the first alignment layer and including liquid crystal monomers (hereinafter called "reactive mesogens") which are twisted and which have been cured.

According to a second aspect of the present invention, there is provided a method of producing a liquid crystal device, comprising the steps of providing, on a substrate, a patterned alignment layer structure having a plurality of alignment regions with different alignment directions, and providing a liquid crystal layer on an exposed surface of the patterned alignment layer structure, wherein of the patterned alignment layer structure is formed by providing a first alignment layer having a first alignment direction on the substrate, providing a layer of a curable reactive mesogen composition having a twist structure, on the first alignment layer, and effecting selective regional curing of such composition so as to fix the twist therein.

The plurality of alignment regions preferably include first alignment regions and second alignment regions.

In a first embodiment, the first alignment regions are defined by the first alignment layer, and the second alignment regions are defined by at least some of the cured and twisted reactive mesogens of the second alignment layer, the second alignment layer being patterned so as to expose the first alignment regions defined by the first alignment layer.

In such first embodiment, it is possible to align the first alignment layer simply by unidirectionally rubbing the whole of the first alignment layer. The second alignment layer can then be formed by providing a layer of a curable reactive mesogen composition over the unidirectionally rubbed first alignment layer followed by masking, selective curing of the reactive mesogens to define the second alignment regions, and subsequently removing the uncured regions so as to expose the first alignment regions in the underlying first alignment layer.

In a second embodiment, a curable reactive mesogen composition is used which exhibits a different twist angle at different temperatures. Thus, by selectively curing different regions of the reactive mesogen composition at different temperatures (e.g. by use of non-heating polymerising radiation such as UV radiation), it is possible to fix different twist angles in different regions of the second alignment layer. Thus, in this embodiment, it is not essential to leave uncured regions which are subsequently removed so as to expose parts of the underlying first alignment layer, although this may be done if required. By this technique it will be understood that, by appropriately repeating masking and curing at different temperatures, it is possible to produce any desired number of different alignment regions providing different alignment directions for the overlying liquid crystal layer.

In order to provide the required twisted structure in the second alignment layer, it is convenient to employ a chiral dopant in the second alignment layer since the amount of dopant included can be used to control the degree of twist which occurs in the second alignment layer, thereby controlling the azimuthal alignment of the second alignment direction relative to the first alignment direction. However, it is alternatively possible to use reactive mesogens which are themselves chiral.

In the case where a chiral dopant is included, the concentration percentage, C, of a chiral dopant to be included in a liquid crystal layer of thickness, d, in order to induce a "twist-off" angle $\phi°$ can be determined by the formula:

$$C = (\phi \times 100)/(360 \times d \times T_p)$$

where $T_p$ is a constant (with dimensions of length$^{-1}$) known as the 'twisting power' of the chiral dopant.

Examples of suitable chiral dopants are CB15 (Merck, $T_p$=32 $\mu m^{-1}$), R1011 and S1011 which are respectively right- and left-twisting dopants (Merck, $T_p$=7.5 $\mu m^{-1}$).

In the second embodiment described above, use is made of a curable reactive mesogen composition which exhibits a different twist angle at different temperatures. Chiral dopants exist whose twisting power is a strong function of temperature, some even showing twist inversion (i.e. a change in handedness) with temperature. An example of such a material is 18,19,21,27-tetranorcholesteryl anisoate, see H. Stegemeyer et al, Z. Naturforsch., 44a, 1127–1130, (1989).

In a convenient embodiment, the first alignment layer is a unidirectional alignment layer and may be provided by a rubbed polymer layer, e.g. a rubbed polyimide layer.

In one convenient embodiment, the liquid crystal device comprises a further substrate and a further alignment layer structure disposed in contact with an opposite surface of the liquid crystal layer. Such further alignment layer structure may be a patterned alignment layer structure, e.g. of the type defined above, or it may be a unidirectional alignment layer structure produced, for example, by unidirectional rubbing of a single alignment layer.

It will therefore be appreciated that the present invention can be realised using only a single rubbing operation and a single masking and curing operation to produce the patterned alignment layer structure. It will further be appreciated that there is no need to use polarised light and that the mutual inclination of the first and second alignment directions can be controlled relatively simply by controlling the amount of chiral dopant used in the reactive mesogen composition.

In one convenient embodiment, the alignment directions are mutually azimuthally orientated at 90°.

In another convenient embodiment, the first and second alignment directions are mutually azimuthally orientated at 180°.

In a particularly convenient embodiment, the first alignment regions alternate with respective second alignment regions.

In a preferred embodiment, selective curing of the layer of twisted reactive mesogens is effected by masking and photopolymerising.

There are no particular restrictions on the type of reactive mesogen used (typical examples are acrylates and vinyl ethers), or on any chiral dopant employed (which may be right or left handed).

There are no particular restrictions on the type of liquid crystal (LC) layer deposited on the patterned alignment layer structure. The LC may be nematic or smectic (e.g. the ferroelectric smectic-C* phase). The LC may itself contain chiral dopants, as in the well known STN and TN displays. There are no particular restrictions on the type of device in which the patterned (i.e. multi-domain) alignment layer structure is employed.

BRIEF DESCRIPTION OF THE DRAWINGS

Embodiments of the present invention will now be described, by way of examples, with reference to the accompanying drawings, in which.

DETAILED DESCRIPTION OF THE INVENTION

Figure 1:
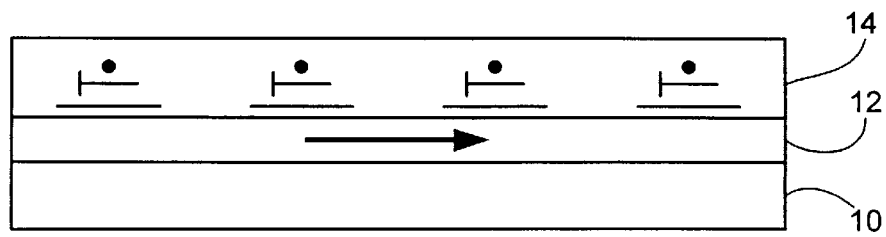
FIGS. 1 to 3 show various stages in the production of a liquid crystal device according to the present invention.
Figure 2:
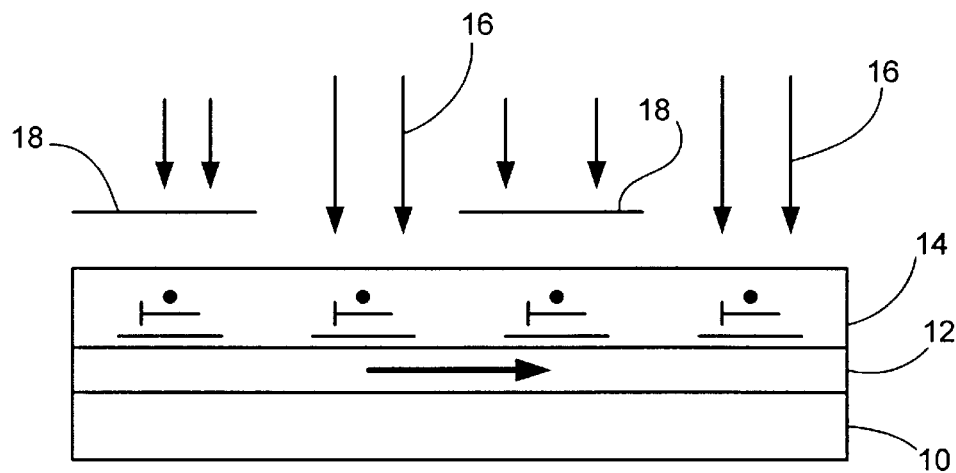
Figure 3:
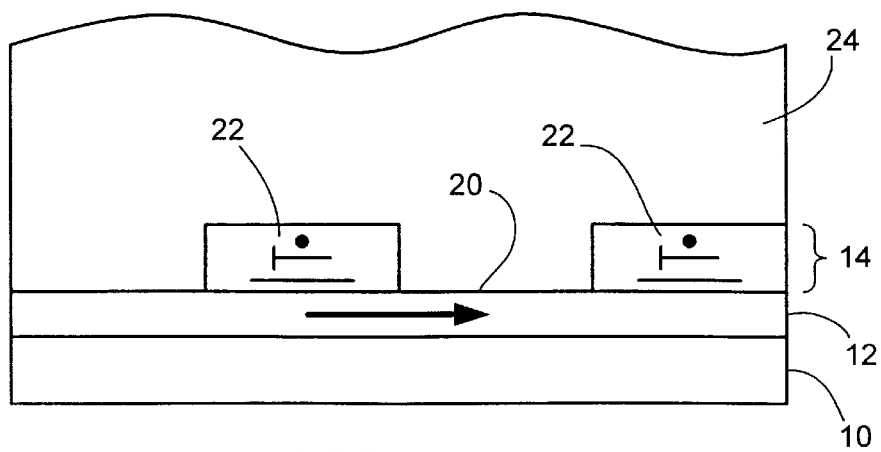

Referring now to FIGS. 1 to 3, one embodiment of liquid crystal device according to the present invention is produced by forming, on a substrate 10, a first alignment layer 12 formed of a polymer, e.g. a polyimide, followed by unidirectional rubbing so that the first alignment layer 12 has a first alignment direction indicated by the arrow in such layer 12. A reactive mesogen layer 14 containing a chiral dopant is provided over the layer 12 by any convenient procedure such as by spin coating, draw bar coating or dip coating. Initially, the reactive mesogen molecules are in their uncured, low molar mass form and those molecules which are adjacent the surface of the layer 12 are aligned by the latter. However, the chiral molecules which are included in the layer 14 cause a twist to be induced in the liquid crystal molecules over the thickness of the layer 14. Schematically, this is shown in FIG. 1 as a 90° twist. In an alternative embodiment, the reactive mesogen molecules themselves are chiral.

As shown in FIG. 2, the layer 14 is selectively exposed to photocuring (photopolymerising) light 16 through a mask 18 so that predetermined exposed regions of the layer 14 are polymerised whilst the regions of the layer 14 which lie under the mask 18 are uncured (unpolymerised).

Then, the unpolymerised parts of the layer 14 are removed by dissolving them in an appropriate solvent whereby to leave a pattern of first alignment regions 20 alternating with a pattern of second alignment regions 22. It will therefore be understood that the pattern of first alignment regions 20 is defined by the first alignment layer 12, whilst the pattern of second alignment regions 22 is defined by the cured, twisted reactive mesogen layer 14. Thus, the second alignment regions 22 have a second alignment direction which is disposed at 90° to the first alignment direction of the first alignment regions 20.

As an alternative to employing a solvent to dissolve the unpolymerised parts of the layer 14, it is within the scope of the present invention to use another technique such as plasma etching.

A layer 24 of a bulk liquid crystal material is then deposited on the patterned alignment layer structure defined by the regions 20 and 22. The liquid crystal molecules which are adjacent to the alignment layer structure define by the alignment regions 20 and 22 will thus adopt the alignment directions of the underlying alignment region 20 or 22, thereby producing two sets of liquid crystal domains with differing alignment directions.

EXAMPLE 1

Glass substrates were used which had been coated with a polyimide (PI2555-Du Pont) and unidirectionally rubbed to induce alignment of the reactive mesogen molecules. Such coating with PI2555 was effected by dissolving the PI2555 in 20 parts by weight of a proprietary solvent (T39039-DuPont) and filtering the solution down to 0.2 $\mu$m using PTFE filters. A few drops of this solution were spun (4 krpm, 40 seconds) onto the substrates which had been cleaned using a combination of sodium hydroxide solution, de-ionised water and propanol. The substrates were then baked at 90° C. for 30 minutes to drive off excess solvent and then at 250° C. for 1.5 hours to induce imidisation of the PI2555. The polyimide film was then unidirectionally rubbed with a soft cloth to induce unidirectional alignment. One part by weight of a diacrylate reactive mesogen material RM257 (Merck Ltd) was mixed with 10 parts by weight of toluene as a solvent and a small amount (~1% by weight) of a photoinitiator (Daracur 4265-Ciba Geigy). Four such mixed were prepared containing a chiral dopant (R1011-Merck Ltd.), added to the RM257 in weight percentages 0.0, 0.9, 2.0 and 4.6%. A few drops of each mix was spun (5 krpm, 10 seconds) onto the coated and rubbed glass substrates. Each of the four substrates was cured by exposure to UV light under a nitrogen atmosphere.

Following curing, each of the substrates was spun (2 krpm, 10 seconds) with a few drops of RM257+2% (wt:wt) LSB 278 (a blue dichroic dye, Mitsubishi Chemicals Ltd), diluted with 3 parts by weight of toluene. This second or upper RM layer was then cured as above. No chiral dopant was added to this layer. If light polarised along the long axis of a dye molecule is absorbed more strongly than light polarised along the short axis, the dye is said to be 'dichroic'. The anisotropic dye molecules dispersed within the upper RM layer were cooperatively aligned by the RM molecules in such layer and hence the dye molecules served to highlight the average direction along which the RM molecules were aligned.

Due to the presence of chiral dopant, the molecules at the top surface of the lower RM layer were twisted away from the underlying alignment direction of the rubbed polyimide. The top surface of the lower RM layer acted as the alignment surface for the overlying dyed RM layer. The reactive mesogen molecules in the upper dyed layer therefore aligned at some angle to the underlying polyimide rubbing direction, this angle being dictated by the twist in the lower RM layer.

Figure 4:
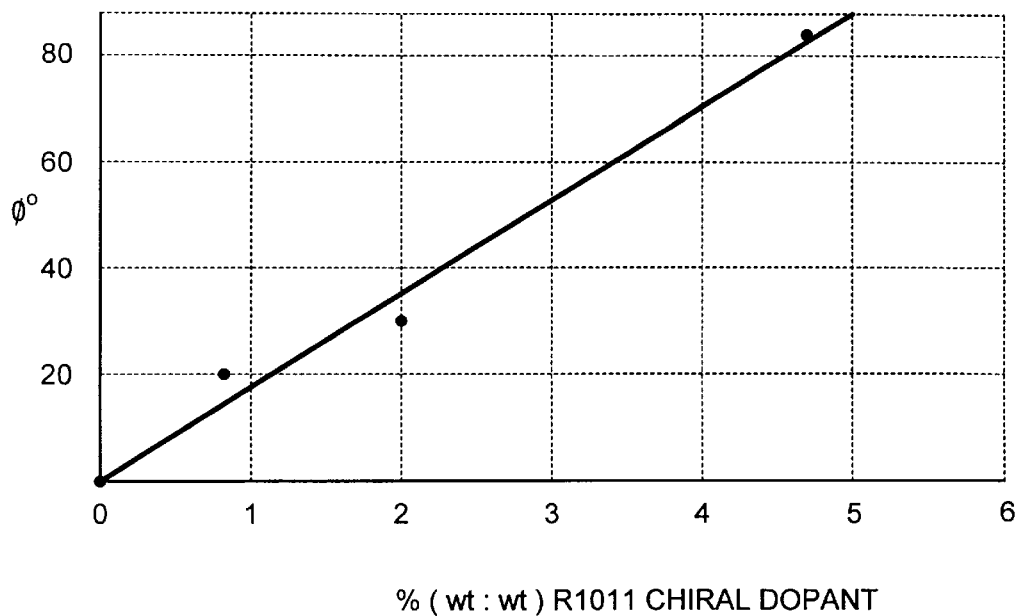
FIG. 4 is a graph plotting "twist-off" angle against percentage of chiral dopant in a reactive mesogen composition.

The four substrates were illuminated with 600 nm unpolarised light and viewed in transmission through a single polariser. The polariser was rotated and the "twist-off" angle, φ, between the known rubbing direction of the underlying polyimide and the axis of maximum light absorption by the dye was measured. The results are shown in FIG. 4, from which it will be seen that there is a direct relationship between the amount of chiral dopant and the twist-off angle φ.

Figure 5:
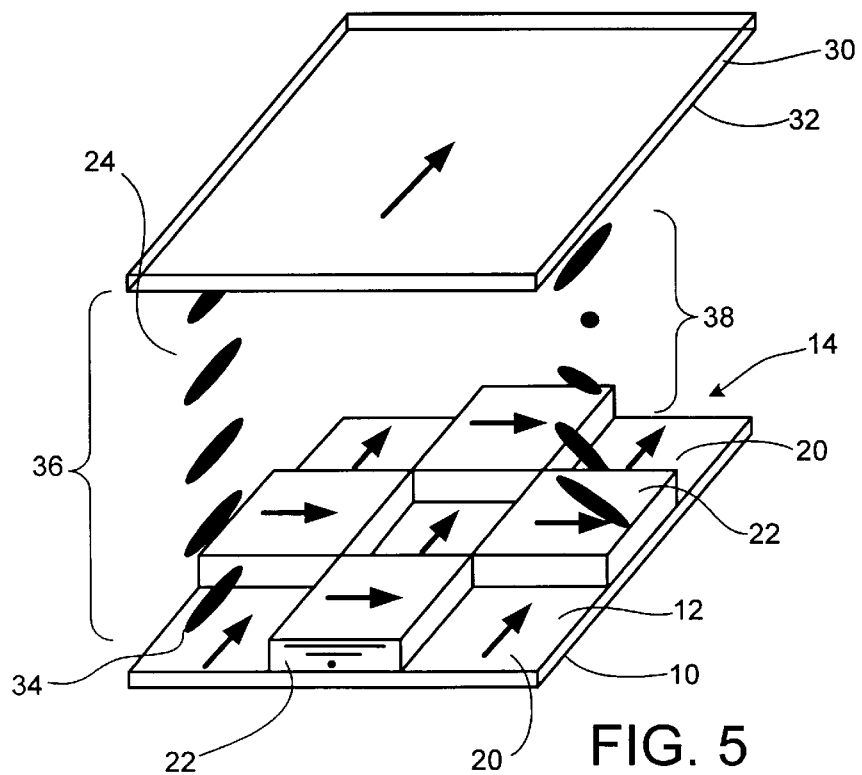
FIG. 5 is a schematic perspective view of a liquid crystal device according to the present invention.

Referring now to FIG. 5, there is shown a liquid crystal device wherein parts similar to those of FIGS. 1 to 3 are accorded the same reference numerals. In this embodiment, a further substrate 30 with a unidirectionally rubbed polyimide alignment layer 32 is provided on the opposite surface of the liquid crystal layer 24 to the substrate 10 and regions 20 and 22. As can be seen from FIG. 5, the alignment direction of the further alignment layer 32 is parallel to that of the layer 12.

EXAMPLE 2

Two glass plates, coated with transparent indium tin oxide electrodes were cleaned using a sodium hydroxide solution and de-ionised water. Each was uniformly coated with a thin (~1 nm) layer of a polyimide (Probimide 32-Du Pont) by spin coating a few drops of the polyimide for 40 seconds at 3 krpm onto the plates. The spun plates were baked at 300° C. for 2 hrs in nitrogen to induce imidisation, and unidirectionally rubbed with a nylon cloth. A solution of the commercially available diacrylate reactive mesogen material RM257 (Merck), mixed with 1% (wt:wt) of commercial photoinitiator (Daracur 4265) and ~4% (wt:wt) of the chiral dopant S1011 (Merck Ltd) was prepared. This mixture was then diluted in the ratio 1:7 with toluene as solvent and a few drops were spun onto one of the rubbed Probimide plates at 5 krpm for 10 seconds. The twisted reactive mesogen layer was exposed to UV light (~360 nm wavelength) for 30 seconds through a photomask in the form of a "chessboard" of 100 $\mu$m×100 $\mu$m squares, with adjacent squares being alternately transparent and opaque to UV light. Following the UV exposure, the plate was dipped in isopropyl alcohol (IPA) to remove the uncured reactive mesogen which had remained unexposed to UV light. After drying off the IPA in a nitrogen flow, the entire plate was UV illuminated under nitrogen for ~5 minutes to ensure that the 100 $\mu$m×100 $\mu$m square regions of reactive mesogen remaining on the plate were fully polymerised. The completed plate thus consisted of a pattern of square regions of reactive mesogen polymer and adjacent regions of Probimide 32. The reactive mesogen polymer squares were measured by a profilometer as having a thickness, d, of ~0.1 $\mu$m. The optical thickness of the RM squares (estimated at 0.015 $\mu$m) was low enough for them to be barely visible under a polarising microscope. In this Example, it is desirable that the reactive mesogen layers should have as small an optical thickness so as to not contribute to the birefringent optical properties of any LCD in which they are incorporated.

The glass plate coated with the RM 'chessboard' was combined with the second, uniformly Probimide 32-coated plate, and glued leaving a gap of 10 $\mu$m between the plates using glass spacer beads. The completed cell was filled with the commercially available nematic LC mixture E7 (Merck) and was of the type described above with reference to FIG. 5. FIG. 5 shows the orientation of the E7 molecules within the cell. The ellipsoids 34 represent the molecules of this liquid crystal, which are uniformly aligned in regions such as 36 and which undergo a twist in regions such as 38.

The completed cell was placed between crossed polarisers with the rubbing direction of the top plate (30,32) oriented parallel to the polariser axis adjacent to that plate. The untwisted regions of sample then appeared black (optically extinct) between the crossed polarisers. The twisted regions of E7, however, were not optically extinct. This well known phenomenon whereby a twisted birefringent layer placed between crossed polarisers can allow the transmission of light is known as 'optical guiding' and underlies the basis of operation of twisted nematic (TN) LCDs. By rotating the polariser adjacent to the plate (10) coated with the RM 'chessboard', through an angle of 120°, the twisted regions of sample could be caused to become substantially optically extinct. Of course, the untwisted regions of the sample no longer appeared black once the polarisers were uncrossed.

EXAMPLE 3

Figure 6:
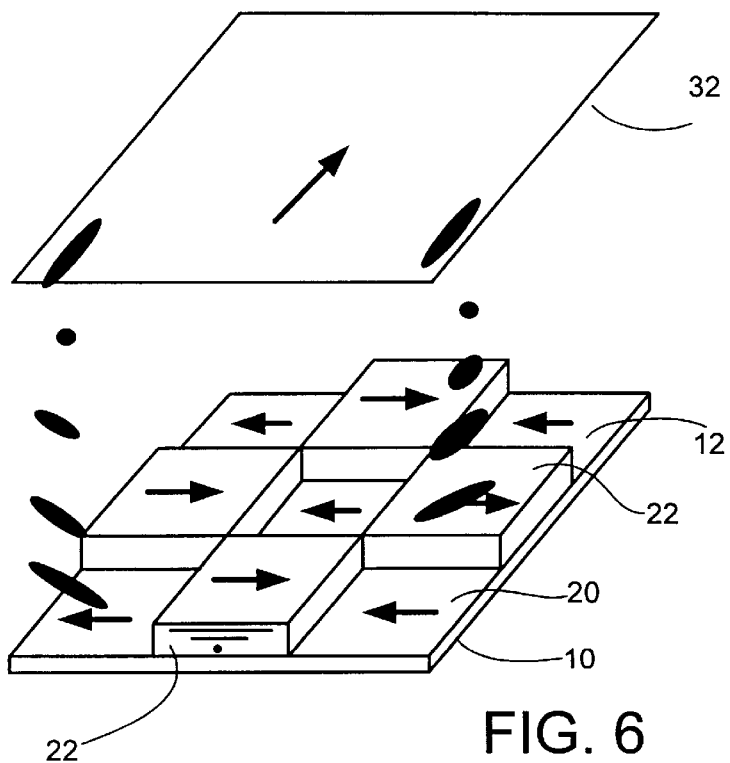
FIGS. 6 and 7 are schematic perspective views of further liquid crystal devices according to the present invention.

Referring now to FIG. 6, the device illustrated therein is similar to that of FIG. 5 and similar parts are accorded the same reference numerals. In this embodiment, however, the twist in the second regions 22 is such that the second alignment direction is at 180° relative to the first alignment direction. Also, the alignment direction of the further alignment surface 32 is at 90° to the first alignment direction of the first alignment regions 20. This provides a two domain twisted nematic liquid crystal layer 24 with adjacent pixels having opposite handedness of twist. Such an arrangement overcomes the problem which occurs in conventional LCD panels wherein, when an electric field of sufficient magnitude is applied across the LC (normal to the glass substrates), the molecules begin to reorient along the direction of the field. This reorientation, however, is generally incomplete with not all molecules of the LC aligning perpendicular to the glass plates. Instead, molecules realign with their long axis extending at some angle to the normal to the glass plates. Since this angle is finite, two observers viewing the liquid crystal from different azimuthal positions will see different projections of the liquid crystal optical axes. This is the well known viewing angle problem of twisted nematic LCDs. This viewing angle dependence can be reduced by subdividing each pixel of a display into domains with differing alignment directions, as described above with reference to FIG. 6.

In a modification of the device of FIG. 6, the unidirectionally rubbed further alignment layer 32 is replaced by a patterned twisted reactive mesogen alignment layer structure as described previously. This enables more than two liquid crystal director configurations to exist within the liquid crystal layer 24, thereby allowing for still wider viewing angle characteristics. There is no restriction on the pattern arrangement or on the amount of twist in the different regions of the device.

Figure 7:
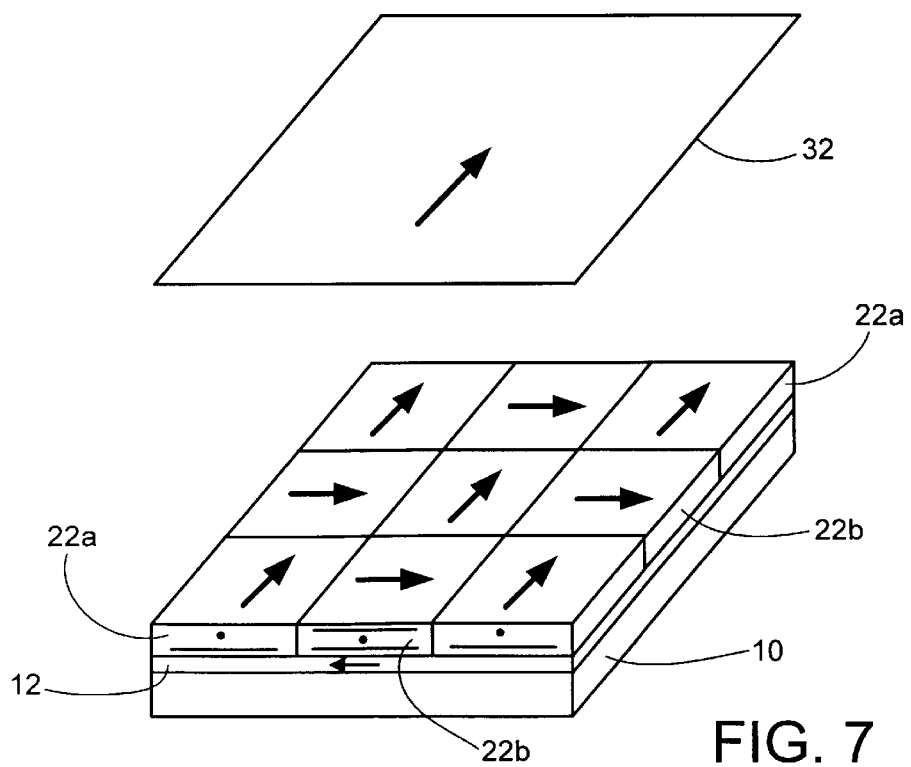

Referring now to FIG. 7, the liquid crystal device illustrated therein is similar to that of FIG. 6, except that in this case, regions 22a alternate with regions 22b in the same layer. This is produced by using for such layer a curable reactive mesogen composition which exhibits a different twist angle at different temperatures. The composition includes a chiral dopant whose twisting power is a strong function of temperature. Thus, the curable reactive mesogen composition is first applied to layer 12 and is then selectively exposed at a first (lower) temperature to crosslinking radiation to define the regions 22a. Then, the temperature is increased and the remainder of the reactive mesogen layer is subjected to crosslinking radiation to form the regions 22b.

Linearly polarised light passing through a twisted birefringent material can undergo 'optical guiding', whereby the polarisation axis of the light is rotated and follows the helical twist of the material. Such optical properties of liquid crystal are dealt with in the literature. In particular, it is well known that, for optical guiding to take place in a liquid crystal layer, it must meet the well known 'Maugin Limit' (or alternatively one of the well-known first, second, third etc minima conditions) which relates the twist angle and optical thickness of the layer to the wavelength of incident light.

What is claimed is:

1. A liquid crystal device comprising:
   a substrate;
   a patterned alignment layer structure on the substrate; and
   a liquid crystal layer having a surface in contact with the patterned alignment layer structure, the patterned alignment layer structure having a plurality of alignment regions with different alignment directions,
   wherein the patterned alignment layer structure comprises a first alignment layer having a first alignment direction, and a second alignment layer disposed over the first alignment layer, and including reactive mesogens which are twisted and which have been cured.

2. A device as claimed in claim 1, wherein the first alignment layer is a unidirectional alignment layer.

3. A device as claimed in claim 1, wherein the plurality of alignment regions include first alignment regions and second alignment regions.

4. A device as claimed in claim 3, wherein the first and second alignment regions have respective alignment directions which are mutually azimuthally orientated at 90°.

5. A device as claimed in claim 3, wherein the first and second alignment regions have respective alignment directions which are mutually azimuthally orientated at 180°.

6. A device as claimed in claim 3, wherein the first alignment regions are defined by the first alignment layer, and the second alignment regions are defined by at least some of the cured and twisted reactive mesogens of the second alignment layer, the second alignment layer being patterned so as to expose the first alignment regions defined by the first alignment layer.

7. A device as claimed in claim 3, wherein the first and the second alignment regions are defined by different regions of the second alignment layer.

8. A device as claimed in claim 1, wherein the cured reactive mesogens have a twist imparted thereto by a chiral dopant.

9. A device as claimed in claim 1, wherein the reactive mesogens are chiral.

10. A device as claimed in claim 1, wherein the different alignment regions present an alternating pattern.

11. A device as claimed in claim 1, comprising a further substrate and a further alignment layer structure disposed in contact with an opposite surface of the liquid crystal layer.

12. A method of producing a liquid crystal device, comprising:
   the steps of providing, on a substrate, a patterned alignment layer structure having a plurality of alignment regions with different alignment directions;
   and providing a liquid crystal layer on an exposed surface of the patterned alignment layer structure,
   wherein the patterned alignment layer structure is formed by
   providing a first alignment layer having a first alignment direction on the substrate,
   providing a layer of a curable reactive mesogen composition having a twist structure on the first alignment layer, and
   effecting selective regional curing of such composition so as to fix the twist.

13. A method as claimed in claim 12, wherein the first alignment layer is a unidirectional alignment layer.

14. A method as claimed in claim 12, wherein the alignment layer structure is provided so as to define first alignment regions and second alignment regions.

15. A method as claimed in claim 14, wherein the first and second alignment regions have respective alignment directions which are mutually azimuthally orientated at 90°.

16. A method as claimed in claim 14, wherein the first and second alignment regions have respective alignment directions which are mutually azimuthally orientated at 180°.

17. A method as claimed in claim 12, comprising the further steps of:
   masking the curable reactive mesogen composition layer;
   selectively curing the reactive mesogen composition to define the second alignment regions; and
   subsequently removing the uncured regions so as to expose the first alignment regions in the underlying first alignment layer.

18. A method as claimed in claim 12, wherein the first and the second alignment regions are defined by different regions of the second alignment layer.

19. A method as claimed in claim 18, wherein the curable reactive mesogen composition exhibits a different twist angle at different temperatures, and selective curing of different regions of the reactive mesogen composition at different temperatures is effected so as to fix different twist angles in different regions of the second alignment layer.

20. A method as claimed in claim 12, comprising the further step of a chiral dopant in the curable reactive mesogen composition.

21. A method as claimed in claim 12, wherein the reactive mesogens in the composition are chiral.

22. A method as claimed in claim 12, wherein the different alignment regions are provided so as to present an alternating pattern.

23. A method as claimed in claim 12, comprising the further step of providing a further substrate and a further alignment layer structure in contact with an opposite surface of the liquid crystal layer.

24. A liquid crystal device when produced by a method as claimed in claim 12.

* * * * *